G. S. MURDOCK.
BRUSH MAKING MACHINE.
APPLICATION FILED JAN. 7, 1904.
944,142.
Patented Dec. 21, 1909.
4 SHEETS—SHEET 2.
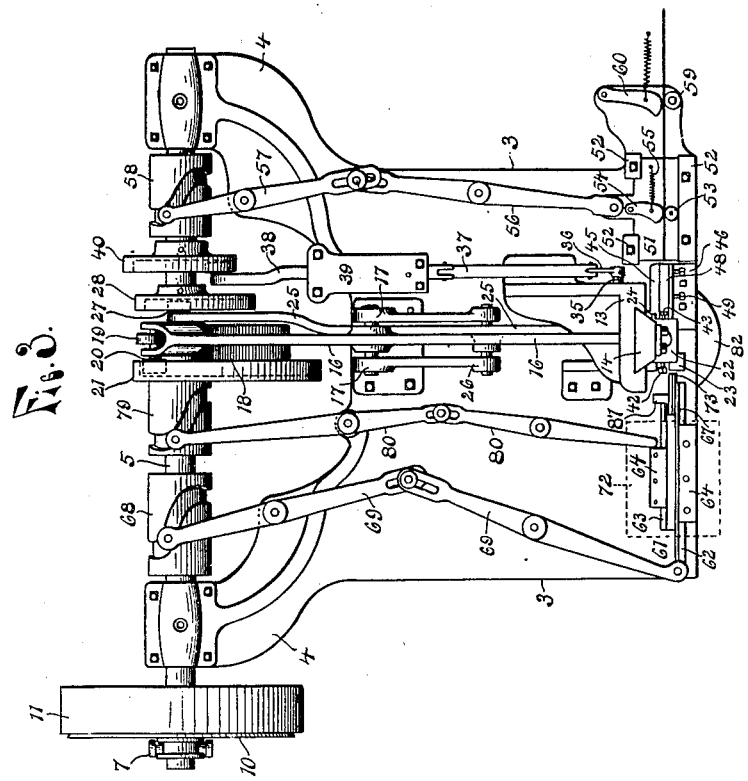
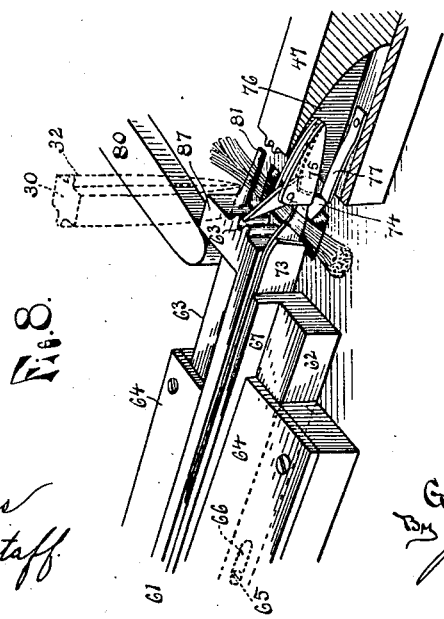
WITNESSES.
INVENTOR.
Gilford S. Murdock
Attorneys.

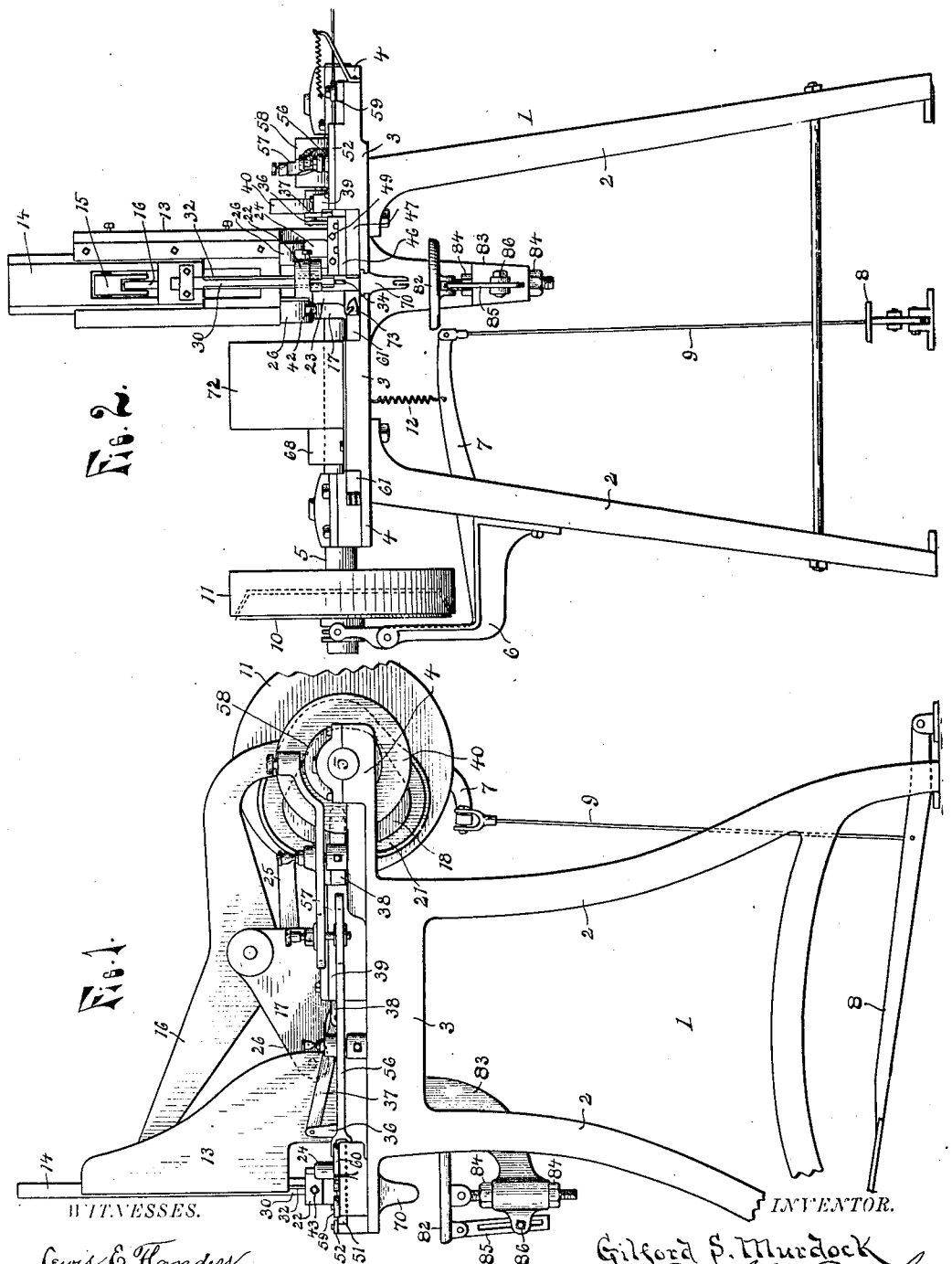

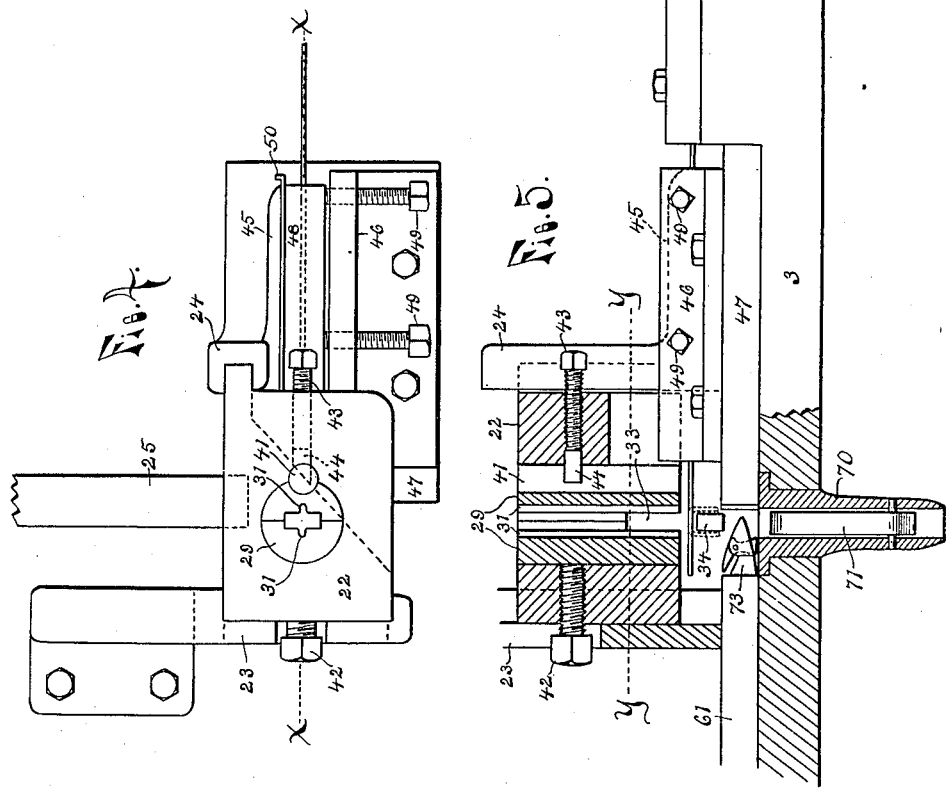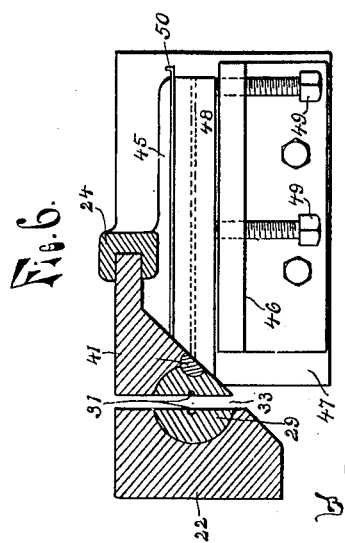

G. S. MURDOCK.
BRUSH MAKING MACHINE.
APPLICATION FILED JAN. 7, 1904.
944,142.
Patented Dec. 21, 1909.
4 SHEETS—SHEET 4.
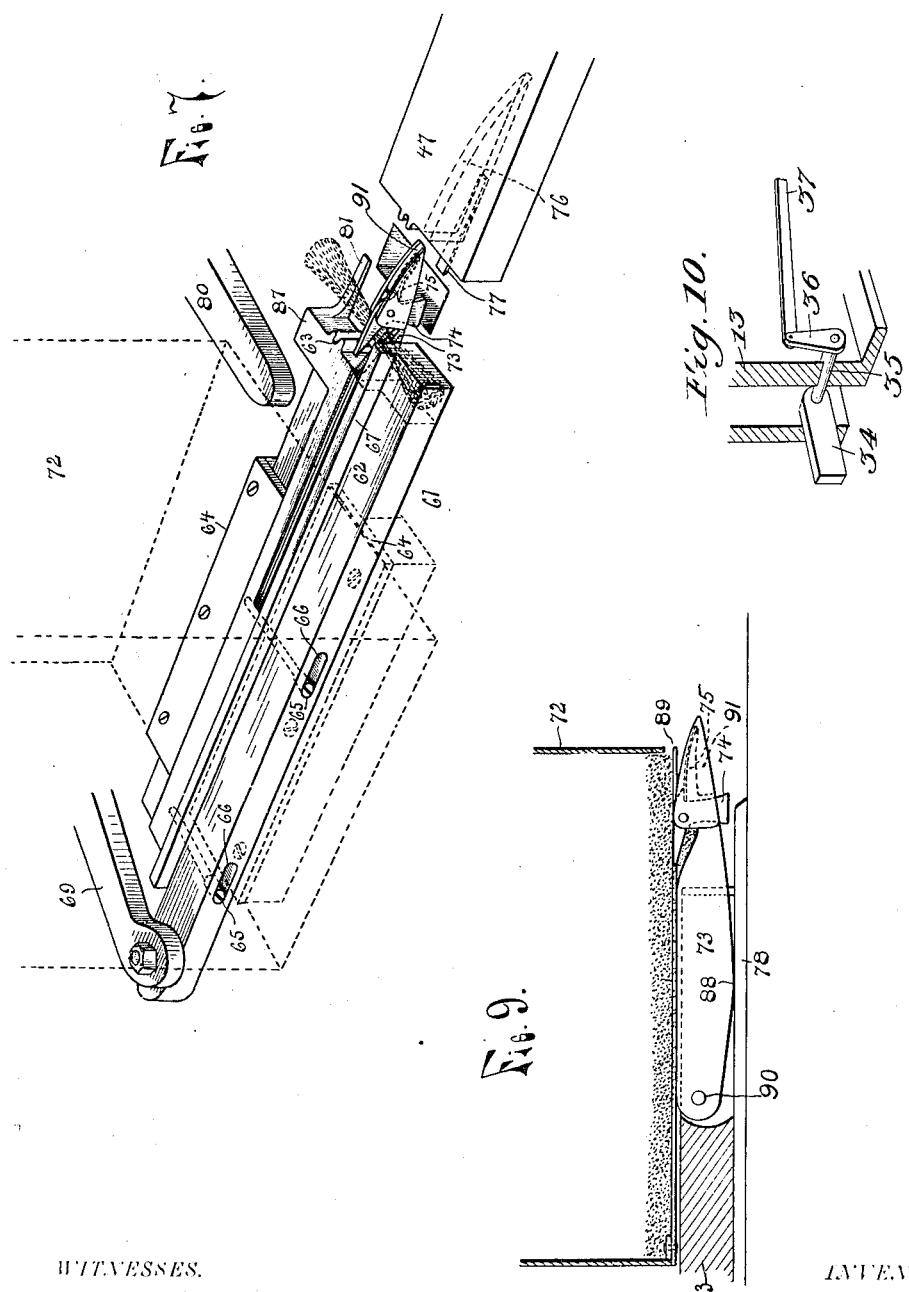

UNITED STATES PATENT OFFICE.

GILFORD S. MURDOCK, OF DETROIT, MICHIGAN.

BRUSH-MAKING MACHINE.

944,142.

Specification of Letters Patent.   Patented Dec. 21, 1909.

Application filed January 7, 1904.  Serial No. 188,023.

*To all whom it may concern:*

Be it known that I, GILFORD S. MURDOCK, a citizen of the United States of America, residing at Detroit, in the county of Wayne and State of Michigan, have invented certain new and useful Improvements in Brush-Making Machines, of which the following is a specification, reference being had therein to the accompanying drawings.

This invention relates to new and useful improvements in machines for making brushes, and has for its object to make a machine which will automatically feed the fibrous material in bunches to the stapling mechanism and at the same time make and drive the staples into the brush block.

To this end the invention consists in the means for feeding the material in regular bunches to the stapling device, the means for feeding and cutting off the wire, the mechanism for forming and driving the staple into the brush block to secure the bunches therein and in the peculiar construction, arrangement and combination of parts all as more fully hereinafter described and shown in the accompanying drawings, in which:—

Figure 1, is a side elevation of a brush machine embodying my invention, Fig. 2, is a front elevation thereof, and Fig. 3, is a plan view of the same, Fig. 4, is a plan view of the vertically movable die block and guides therefor, Fig. 5, is a vertical central section through the die block on the line x—x Fig. 4, Fig. 6, is a section at right angles thereto on the line y—y Fig. 5, Fig. 7, is a perspective view of the feed mechanism and actuating means therefor, Fig. 8, is a similar view showing the mechanism in its forward position ready to release the bunch, Fig. 9, is a vertical central section through the lower portion of the hopper and feed mechanism, Fig. 10, is a perspective view showing the finger mechanism.

1 is the frame comprising the legs 2 and top or bed 3 secured thereto in any suitable manner and provided with rearward extensions or brackets 4 formed with bearings in which the shaft 5 is journaled.

6 is a bracket secured to the frame in the upper end of which is pivoted the bell crank lever 7 connected with a foot lever 8 at one end by means of the rod 9 and at its opposite end loosely engaging the hub of the movable member 10, splined on the shaft and formed with a tapering face adapted to engage the internal taper face of the loose pulley 11 to form a friction clutch, a spring 12 being provided to normally hold said lever elevated to release the clutch.

13 is a bracket secured to the bed of the machine near its forward edge and provided with vertical ways in which the plunger 14 reciprocates connected by means of a link 15 to a lever 16 pivoted at its middle in a double bracket 17 and with its rearwardly extending forked end riding on a cam 18 on the shaft 5 to move the plunger downward. An antifriction roll 19 is journaled between the forked ends of said lever and a second roll 20 is also carried by said lever coöperating with an internal cam 21 formed integral with the cam 18 to return the plunger.

22 is a vertically movable die block traveling in the guide pieces 23 and 24 secured to the machine bed directly below the plunger 14, the bracket 13 being cut away at this point.

25 is a lever fitting in a socket formed in the back of the die block and pivotally mounted between the two forwardly extending ears 26 of the bracket 17 and at its rear end carrying an antifriction roll 27 coöperating with an internal cam 28 on the shaft 5 for reciprocating the die block in timed relation to the plunger.

29 is the die proper made in two like semi-circular halves to form a rectangular passage between them for the hammer 30 carried by the plunger 14 each half of the die being longitudinally scored at 31 to receive the ribs 32 on the hammer and also form a space to hold the wire staple before being driven, the die having a transverse cut 33 at its lower end to receive a finger 34 over which the staples are formed, said finger being mounted on a shaft 35 carrying a rock arm 36 connected by a link 37 with the rod 38 guided in a casing 39 and carrying at its rear end an antifriction roller coöperating with an internal cam 40 to reciprocate the parts.

41 is a rod filed away at one side to form a knife for cutting off the wire, the round face of which forms a key for the die. 42, 43 are set screws for holding the halves of the die in place and 44 is an angular block interposed between the knife and set screw 43 to hold the knife at the proper angle.

Extending laterally from the guide piece 24 and integrally formed with the base thereof is the rib 45 and 46 is an L shaped bracket secured to the block 47 by machine screws which in turn secure the block to the bed.

48 is a rectangular bar fitting between the ribs 45 and 46 and clamped against the rib 45 by means of the set screws 49 said bar being cut off at an angle to correspond with that of the knife 41 and provided with a central longitudinal aperture for the wire. By placing one or more shims 50 between the ribs and bar the point at which the wire will be cut off can be varied within certain limits to make different sized staples.

The mechanism for feeding the wire comprises a reciprocating plate 51 secured in place upon the bed by the gibs 52 and carrying a roll 53 and cam lever 54 pivoted eccentric thereto between which the wire is fed, a spring 55 holding the cam against the roll.

56 and 57 are levers pivotally connected together at their adjacent overlapping ends and pivotally mounted upon the bed at their middle, the free end of the lever 56 being connected to the plate 51 and the free end of the lever 57 coöperating with a cam 58 to reciprocate the plate 51 to feed the wire, a second roll 59 and cam lever 60 similar to the roll 53 and lever 54 being arranged upon a stationary part of the feed table so that these will grip the wire while the plate 51 carrying the dogs 53, 54 moves back to take a new hold on the wire the dogs 59, 60 being released as the plate 51 moves forward to feed the wire.

61 is a slide made in two parts 62 and 63 guided upon the bed between the gibs 64 and connected together free to have a limited movement in relation to each other by the screws 65 traveling in the slots 66 the part 62 being formed with a longitudinal rib 67 and connected at its rear end with the cam 68 on the shaft 5 through the medium of the levers 69 pivotally connected together at their adjacent overlapping ends and pivoted upon the bed at the middle of each. The part 63 of said slide is grooved at its forward end for the passage of the staple and at the same time to form a guide for the rib 32 on the hammer when in its forward position at which time with the slide 61 on one side and the block 47 on the other a closed pocket will be formed for the brush material so that when the finger 34 is retracted and the hammer descends an unobstructed passage will be presented to double up and force the bunch through the open ended spout 70 and drive the same into the socket in the wooden brush block and secure it in place therein with a staple. The spout 70 is preferably provided with two pivoted spring backed fingers 71 of any desired construction only one of which is shown in Fig. 5 to restrict the passage in starting so as to double up the bunches short in going through thus insuring more evenness in the material.

72 is a feed hopper above the slide 61 provided with a slitted bottom open at its front edge and composed of two springs 89 between which the finger 73 pivoted at 90 on the part 63 of the slide reciprocates.

74 is a trigger pivoted in the forward end of the finger and normally held so that the pointed jaw will be in its closed position as shown in Figs. 5, 7 and 9 by a spring 75. The spring 75 holds the base of the trigger 74 against a suitable stop formed by the filler block 91 secured between the two plates of the finger between which the trigger is pivoted.

76 is an undercut slot in the block 47 coöperating with the curved end of the finger and 77 is a flat leaf spring forming a stop to engage the lower end of the trigger and trip the same to release the bunch when in its forward position as shown in Fig. 8 suitable guides being formed in the front edge of the block 47 for the guides 32 on the hammer 30.

78 is a rib on the feed table on which the finger 73 reciprocates to hold it in its elevated position as shown in Fig. 9, the underside of said finger being cut away at an angle so that as it clears the inclined end of said rib it will permit the finger to drop with the bunch in front of the slide 61.

79 is a cam on the shaft 5 acting through the medium of the levers 80 to finally move the part 63 of the slide forward the length of the slots 66 after the part 62 has reached its extreme forward movement in order to bring the bunch in front of the slide and directly over the discharge opening.

81 is a forwardly projecting finger integrally formed with the part 63 and with the finger 73 adapted to support the bunch on each side of its middle so that as the hammer 30 strikes the bunch between said fingers 73 and 81 it will with the aid of the fingers 71 double up the bunch and force it through the spout into the socket in the brush block.

82 is the work supporting table having a screw threaded shank vertically adjustably secured in the arm 83 by the nuts 84 the table being adjustable to any angle by means of the slotted link 85 and clamping bolt 86.

Having thus fully described the invention it is intended to operate as follows; motion being imparted to the shaft 5 and through the medium of the cam 58, levers 56, 57 and plate 51 the wire is fed under the die block where as soon as the block descends through the medium of the lever 25 and cam 28, the wire is cut off and formed over the finger 34 into a staple. The slide 61 at the same time has moved backward across the slotted bottom of the feed hopper and the mouth of the finger 73 has filled with the corn or other fibrous material. The slide 61 now commences its forward movement through the medium of the cam 68 and levers 69 connected to the part 62 of the slide which moves forward first from the position shown in dotted lines Fig. 7 until it abuts against the material in the mouth of the finger 73 as shown in full lines. The material thus forms a stop and carries the part 63 with it and the whole slide 61 moves forward to the position shown in full lines Fig. 7. At this time the lever 80 strikes the projecting end 87 of the part 63 and moves it forward as shown in Fig. 8, so that the shoulder 88 on the side of the finger 73 clears the end of the rib 78 and permits the finger 73 with the bunch to drop in front of the slide 61. The stop 77 will then strike the lower end of the trigger 74 and release the bunch at which time the hammer 30 and die block 22 descends through the medium of the levers 16 and 25 and cuts off, forms and drives the staple over the bunch and into the brush block supported on the support 82. The bunch is doubled up in passing through the spout 70 by the spring fingers 71.

Having thus fully described my invention, what I claim is:—

1. In a brush making machine the combination with the actuating mechanism and frame, of a feed hopper mounted thereon, a two part slide mounted in guides in the frame and traveling across beneath the feed hopper, one part connected with the actuating mechanism and having a limited movement on the other part, a finger having a cut out portion pivotally mounted on the other part and riding on a rib on the frame to hold said finger in its elevated position, a trigger pivoted in said finger adjacent to said cut out portion to form a gripping jaw, a spring to normally hold said trigger to receive the material as it passes beneath the feed hopper, means for moving the part carrying the finger through the medium of the other part and the bunch and separate means for moving the part carrying said finger in advance of the other part to allow the finger to clear the rib and drop the bunch in front of the slide, a block to receive the end of said finger, a stop to trip said trigger to release the bunch and guides formed in the adjacent ends of said slide and block.

2. In a brush making machine the combination with the frame, actuating mechanism and feed hopper mounted thereon, of the means for feeding the wire, forming and driving the staple, of a two part slide mounted in guides on the frame and traveling across the feed hopper, one part connected with the actuating mechanism and having a limited movement on the other part, a finger pivotally carried by the other part and riding on a rib on the frame, a trigger pivotally mounted in a cut out portion of said finger to form a gripping jaw, a spring to normally close said jaw to grip the material as it passes across the hopper, means for moving the part carrying said finger in advance of the other part after the other part has reached its extreme forward movement to allow the finger to drop with the bunch in front of the slide and a stop on the frame to release the bunch.

3. In a brush making machine, in combination with a receptacle for brush tuft material, a reciprocating tuft gatherer and carrier engaging with its edge against said material, there being a notch in said edge wherein a tuft is held during a portion of each reciprocation, means for causing the release of the tuft therefrom at its intended point of delivery, means for locating thereover a staple in position to be driven, and means for thereafter engaging the staple and tuft and forcing the same free from said staple-locating means and into the brushback, substantially as described.

4. In a brush making machine, in combination with a reciprocating gatherer and carrier having two parts, one being carried by the other and being slidable with respect thereto, driving means engaging one of said parts, and a movable member engaging the other of said parts, adapted to cause relative movement of the two parts, substantially as described.

5. In a brush making machine, in combination, a reciprocating gatherer and carrier having two slidably connected parts, a lever to engage one of said parts, a second lever to engage the second of said parts, a shaft, cams on said shaft whereby an irregular motion is communicated to parts in contact therewith, and levers engaging said cams with one end and said levers with the other end, substantially as described.

6. In a brush making machine, in combination, a driver for driving a staple with a tuft of bristles therein, and a reciprocating two part slide, a tuft gatherer carried by one part of said slide and adapted to gather a tuft and deposit the same under the staple, the portion of said slide carrying the gatherer being formed as a staple-guide, substantially as described.

7. In a brush making machine, in combination, a reciprocating two part slide, having a movement relative to each other, a finger pivoted on one part of said slide and having a tuft carrying notch, one side of the engaging portion of said notch being formed by the body portion of said finger, a trigger pivoted in said finger and forming the other side of said notch, and means engaging said trigger whereby the notch is opened and closed, substantially as described.

8. In a brush making machine, the combination with a two part slide, one part having a limited movement relative to the other and provided with a grooved terminal adapted to serve as a staple guide, and a tuft gatherer pivotally connected to said part, substantially as described.

9. In a brush making machine, the combination with the hopper, of a two part reciprocating slide adapted to move transversely beneath the same, a tuft gatherer pivotally carried by one part of said slide and having a notch and a trigger to engage the mass of bristles, the other part of the slide being adapted to confine within the notch a tuft of bristles taken from the mass, means adapted to engage the other part of said slide to cause the release of the tuft at a predetermined point, means for placing over said tuft at the time of its release, a staple in position to be driven and means for thereafter driving both the staple and the tuft into the brush-back, substantially as described.

10. In a brush making machine, the combination with the hopper, of a bristle carrier having a notched finger arranged to move across said hopper and remove a tuft therefrom at each reciprocation thereof, means for causing said carrier to release said tuft at the end of each stroke, means for locating a staple over said tuft at the moment of release thereof, and means for subsequently forcing said tuft and staple into the brush-back, substantially as described.

11. In a brush making machine, in combination with means for feeding a staple forward in position to be driven, a reciprocating notched tuft gatherer and carrier adapted to have some portion of its length in constant engagement against a supply of bristles and to select therefrom at each oscillation a tuft of determined size, means for actuating the gatherer and carrier to locate the tuft at its point of intended deposit between the depending portions of the staple, and a reciprocating slide adapted to advance a portion of the tuft gatherer and carrier to accomplish the release of the tuft therefrom and to thereafter drive the staple and tuft into the brush-back, substantially as described.

In testimony whereof I affix my signature in presence of two witnesses.

GILFORD S. MURDOCK

Witnesses:
OTTO F. BARTHEL,
THOMAS G. LONGSTAFF.